US011103833B2

(12) United States Patent
Choi et al.

(10) Patent No.: US 11,103,833 B2
(45) Date of Patent: Aug. 31, 2021

(54) HYDROPHOBIC POLYETHYLENE MEMBRANE FOR USE IN VENTING, DEGASSING, AND MEMBRANE DISTILLATION PROCESSES

(71) Applicant: ENTEGRIS, Inc., Billerica, MA (US)

(72) Inventors: Wai Ming Choi, West Newton, MA (US); Jad Ali Jaber, Westford, MA (US); Vinay Goel, Billerica, MA (US); Vinay Kalyani, Salem, NH (US); Anthony Dennis, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 129 days.

(21) Appl. No.: 16/086,104

(22) PCT Filed: Mar. 17, 2017

(86) PCT No.: PCT/US2017/022913
§ 371 (c)(1),
(2) Date: Sep. 18, 2018

(87) PCT Pub. No.: WO2017/161241
PCT Pub. Date: Sep. 21, 2017

(65) Prior Publication Data
US 2020/0406201 A1    Dec. 31, 2020

Related U.S. Application Data

(60) Provisional application No. 62/310,378, filed on Mar. 18, 2016.

(51) Int. Cl.
*B01D 53/22* (2006.01)
*B01D 67/00* (2006.01)
(Continued)

(52) U.S. Cl.
CPC ..... *B01D 67/0093* (2013.01); *B01D 19/0031* (2013.01); *B01D 67/0088* (2013.01);
(Continued)

(58) Field of Classification Search
CPC ............... B01D 69/02; B01D 2325/38; B01D 2325/48; B01D 2325/26; B01D 2323/38;
(Continued)

(56) References Cited

U.S. PATENT DOCUMENTS 5,217,802 A   6/1993 Scarmoutzos
6,329,139 B1 * 12/2001 Nova ................... B01J 19/0046
                                                      209/597
(Continued)

FOREIGN PATENT DOCUMENTS

CN    101948606 A    1/2011
CN    103272484 A    9/2013
(Continued)

OTHER PUBLICATIONS

J Lee et al: "Synthesis of perfluorinated ionomer membranes for electrochemical cells", Proceedings of the Symposium on Diaphragms, Separators and Ion Exchange Membranes, Dec. 31, 1986 (Dec. 31, 1986), pp. 102-119, XP055615909, [retrieved on Aug. 28, 2019].

*Primary Examiner* — Anthony R Shumate
(74) *Attorney, Agent, or Firm* — Entegris, Inc.

(57) ABSTRACT

Described is a polyethylene membrane and in particular an ultra-high molecular weight polyethylene member that provides a high air permeability and is hydrophobic. The membranes have small pores and are suitable for sterilization by exposure to gamma radiation. The membranes can be made by methods that involve one or more of stretching the membrane and grafting hydrophobic monomers onto the membrane surface. A perfluorinated monomer, such as perfluoro-n-octyl acrylate, can be grafted to one or more surfaces of the membrane. The membrane have a high flow rate compared to unstretched or ungrafted membranes.

17 Claims, 3 Drawing Sheets

(51) Int. Cl.
  *B01D 19/00* (2006.01)
  *B01D 69/02* (2006.01)
  *B01D 71/78* (2006.01)
  *C08L 51/06* (2006.01)
  *C08L 33/16* (2006.01)

(52) U.S. Cl.
  CPC .............. *B01D 69/02* (2013.01); *B01D 71/78* (2013.01); *C08L 51/06* (2013.01); *B01D 2323/34* (2013.01); *B01D 2323/38* (2013.01); *B01D 2325/02* (2013.01); *B01D 2325/20* (2013.01); *B01D 2325/26* (2013.01); *B01D 2325/28* (2013.01); *B01D 2325/38* (2013.01); *B01D 2325/48* (2013.01); *C08L 33/16* (2013.01)

(58) Field of Classification Search
  CPC ............ B01D 2325/28; B01D 67/0088; B01D 67/0093; B01D 2325/20; B01D 2325/02; B01D 19/0031; B01D 2323/34; B01D 71/78; C08L 33/16; C08L 51/06
  See application file for complete search history.

(56) References Cited

U.S. PATENT DOCUMENTS

| | | | |
|---|---|---|---|
| 2005/0023456 A1* | 2/2005 | Frechet | H01J 49/0418 250/288 |
| 2007/0202342 A1* | 8/2007 | Whiteford | B82Y 30/00 428/425.5 |
| 2007/0208092 A1 | 9/2007 | Yang | |
| 2008/0206624 A1 | 8/2008 | Choudhury | |
| 2010/0167100 A1 | 7/2010 | Moore | |
| 2010/0210745 A1* | 8/2010 | McDaniel | C09D 5/1668 521/55 |
| 2010/0272941 A1 | 10/2010 | Cherukupalli et al. | |
| 2010/0313753 A1 | 12/2010 | Calis | |
| 2011/0008707 A1* | 1/2011 | Muraoka | H01M 8/1013 429/483 |
| 2011/0240064 A1* | 10/2011 | Wales | C09D 7/47 134/26 |
| 2011/0250626 A1* | 10/2011 | Williams | C12Q 1/34 435/18 |
| 2012/0097194 A1* | 4/2012 | McDaniel | A01N 63/10 134/26 |
| 2012/0276576 A1* | 11/2012 | Haddad | G01N 1/2813 435/29 |
| 2014/0127542 A1* | 5/2014 | Li | H01M 8/0289 429/74 |
| 2018/0043656 A1* | 2/2018 | Song | H01G 9/02 |
| 2018/0065105 A1* | 3/2018 | Song | B01J 20/28035 |
| 2018/0200675 A1* | 7/2018 | Ahn | B01D 69/02 |

FOREIGN PATENT DOCUMENTS

| | | |
|---|---|---|
| CN | 104902988 A | 9/2015 |
| EP | 2060315 A2 | 5/2009 |
| EP | 2268386 A1 | 1/2011 |
| EP | 2157430 B1 | 12/2012 |
| JP | 0199606 A | 4/1989 |
| JP | 069810 A | 1/1994 |
| JP | 2010534557 A | 11/2010 |
| TW | 200948466 A | 12/2009 |
| WO | 2004026929 A1 | 4/2004 |

* cited by examiner

HYDROPHOBIC POLYETHYLENE MEMBRANE FOR USE IN VENTING, DEGASSING, AND MEMBRANE DISTILLATION PROCESSES

CROSS REFERENCE TO RELATED APPLICATIONS

This application is filed under the provisions of 35 U.S.C. § 371 claiming priority of International Patent Application No. PCT/US2017/022913 filed on Mar. 17, 2017, which further claims the benefit of U.S. Provisional Application No. 62/310,378, which was filed on Mar. 18, 2016, the entire content of this application is incorporated herein by reference.

BACKGROUND

Hydrophobic membranes are used in a variety of processes, including venting, degassing, and membrane distillation.

Venting operations are performed in a variety of manufacturing processes, including pharmaceutical manufacturing to maintain a sterile environment in the bioreactor. Typically, a venting operation permits gas to vent from a chamber, such as a reaction chamber, while preventing water and pathogens, such as bacteria, viruses and fungus, from entering into the chamber. In this sense, the membrane acts a filter. Venting devices are known in the art, such as those described in U.S. Pat. Nos. 8,852,324 and 8,430,114, and a hydrophobic membrane is typically a component of those and similar devices.

For each of the three processes described above, the membrane should meet certain performance requirements. The membrane should be as hydrophobic as possible, which prevents water from passing across the membrane. Relatedly, the membrane should not wet when contacted with water or another wetting solvent, such as 40% Isopropyl alcohol (IPA) in water. The pore size of the membrane should be sufficiently small in order to prevent pathogens from crossing the membrane. The membranes need to be sterilizable, meaning that they should maintain their structural integrity upon exposure to gamma radiation. Additionally, a membrane that permits a high flow rate of gas is desirable.

Membranes are currently used in degassing operations, though it is desirable to improve their performance with respect to one or more of the criteria outlined above. For example, polytetrafluoroethylene (PTFE) membranes are hydrophobic and permit a high air permeability, but cannot be sterilized with gamma radiation. Polyvinylidene fluoride (PVDF) membranes do not have a high air permeability and are not as hydrophobic as PTFE, and therefore can be wet under certain conditions. Polyethylene membranes, including ultra-high molecular weight polyethylene membranes, are not as hydrophobic as PTFE, and therefore they may wet easily and are not considered suitable for use in venting, degassing, and membrane distillation. Thus, membranes having improved properties with respect to one or more of the criteria described above are desirable.

SUMMARY OF THE INVENTION

Embodiments of the disclosure include a surface modified, porous, polyethylene membrane having an air permeability in a range from about 4.9 slpm/cm$^2$ to about 9.4 slpm/cm$^2$, when measured at about 10 psi, a surface energy in a range from about 15 dyne/cm to about 25 dyne/cm, a liquid intrusion pressure in a range from about 5 psi to about 25 psi when measured in 80:20 methanol:water solution, and a perfluorinated monomer that modifies the surface energy of one or more surfaces of the membrane. The molecular weight of the polyethylene membrane in some embodiments can be in a range from about 2,000,000 Daltons to about 9,000,000 Daltons. The perfluorinated monomer can be a perfluoroacrylate or a perfluoro-n-alkyl acrylate, such as perfluoro-n-octyl acrylate in some versions, the air permeability can be in a range from about 4.9 slpm/cm$^2$ to about 6.1 slpm/cm$^2$ when measured at about 10 psi, or about 5.4 slpm/cm when measured at about 10 psi. In some versions, the surface energy can be in a range from about 21 dyne/cm to about 23 dyne/cm, or about 21.5 dyne/cm. In some versions, the liquid intrusion pressure can be in a range from about 20 psi to about 25 psi when measured in 80:20 methanol:water solution, or about 22 psi when measured in 80:20 methanol:water solution. In one particular version, the air permeability is about 5.4 slpm/cm$^2$ when measured at about 10 psi, the surface energy is about 21.5 dyne/cm, and the liquid intrusion pressure is about 22 psi when measured in 80:20 methanol:water solution. In some versions of the disclosure, the membrane may be either uniaxially or biaxially stretched prior to modifying the surface of the membrane. The membranes are membrane is bacterial retentive, such as determined by ASTM F838-05 (2013).

One embodiment of the disclosure is a vent membrane comprising a stretched porous polyethylene membrane and perfluorinated monomer modifying one or more surfaces of the stretched porous polyethylene membrane; the vent membrane is bacterial retentive as determined by ASTM F838-05/R (2013) and has an air permeability in a range from about 4.9 slpm/cm$^2$ to about 9.4 slpm/cm$^2$ when measured at about 10 psi; and a surface energy in a range from about 15 dyne/cm to about 25 dyne/cm.

In some versions, the molecular weight of the polyethylene membrane is from about 1,000,000 Daltons to about 9,000,000 Daltons, or from about 1,500,000 Daltons to about 2,500,000 Daltons.

In some embodiments of the vent membrane, the polyethylene membrane is biaxially stretched, either before or after modifying the surface of the membrane. In some embodiments disclosed, the vent membrane has a tensile stress in megapascals of about 8 MPa to about 12 MPa and a tensile strain in millimeters per millimeter of about 0.2 mm/mm to about 0.3 mm/mm as measured in the machine direction, and the vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of the vent membrane with a dose of gamma rays of at least about 25 kGy.

In some embodiments of the disclosure, the stretched porous polyethylene membrane is an ultrahigh molecular weight polyethylene. In other embodiments the stretched polyethylene membrane is a polyethylene with a molecular weight that can be in the range of about 100,000 Daltons to about 1,000,000 Daltons. The molecular weight of the polyethylene can be determined using the Mark-Houwink equation as described herein.

In some embodiments of the vent membrane the perfluorinated monomer is a perfluoro-n-alkyl acrylate, such as perfluoro-n-octyl acylate.

In some embodiments of the vent membrane, the vent membrane has a surface energy in a range of from about 21 dynes/cm to about 23 dynes/cm.

In some embodiments of the vent membrane, the vent membrane prior to gamma radiation treatment with a dose of gamma rays has a tensile stress in megapascals of about 12 MPa to about 16 MPa and a tensile strain in millimeters per millimeter of about 0.5 mm/mm to about 0.9 mm/mm as measured in the machine direction and the vent membrane has a tensile stress in megapascals of about 6 MPa to about 8.5 MPa and a tensile strain in millimeters per millimeter of 1.0 mm/mm to 1.8 mm/mm measured in the cross web direction.

Another embodiment of the disclosure is a vent membrane comprising a gamma radiation stable porous polymer membrane and perfluorinated monomer modifying one or more surfaces of the porous polymer membrane. The vent membrane is bacterial retentive as determined by ASTM F838-05. The vent membrane has an air permeability in a range from about 4.9 slpm/cm$^2$ to about 9.4 slpm/cm$^2$ when measured at about 10 psi, and has a surface energy in a range from about 15 dyne/cm to about 25 dyne/cm. Following gamma radiation treatment of the vent membrane with a dose of gamma rays of at least about 25 kGy, the vent membrane has a tensile strain in millimeters per millimeter of about 0.2 mm/mm to about 0.3 mm/mm as measured in the machine direction and the vent membrane has a tensile stress in megapascals of about 5 MPa to about 8 MPa and a tensile strain in millimeters per millimeter of about 0.3 mm/mm to about 0.5 mm/mm as measured in the cross web direction.

In another aspect, described herein is a method of making a grafted, porous, polyethylene (PE) membrane, which in some versions can be an ultra-high molecular weight polyethylene membrane (UPE). The method can include contacting a polyethylene membrane with an alcohol solution comprising benzophenone, contacting the polyethylene membrane with a grafting solution, and exposing the membrane to electromagnetic radiation, thereby resulting in a grafted, porous polyethylene membrane. The molecular weight of the polyethylene membrane can be in a range from about 1,000,000 Daltons to about 9,000,000 Daltons, or from about 1,500,000 Daltons to about 2,500,000 Daltons. The grafting solution can include a perfluorinated monomer and decamethyltrisiloxane. In some instances, the perfluorinated monomer is a perfluoroacrylate or perfluoro-n-alkyl acrylate, such as perfluoro-n-octyl acrylate. The grafted, porous, membrane can have an air permeability in a range from about 4.9 slpm/cm$^2$ to about 9.4 slpm/cm$^2$, such as in a range from about 4.9 slpm/cm$^2$ to about 6.1 slpm/cm$^2$ or about 5.4 slpm/cm$^2$, when measured at about 10 psi (69 kPa). The grafted, porous, membrane can have a surface energy in a range from about 15 dyne/cm to about 25 dyne/cm, such as in a range from about 21 dyne/cm to about 23 dyne/cm, or about 21.5 dyne/cm. The grafted, porous, membrane can have a liquid intrusion pressure in a range from about 5 psi to about 25 psi, such as in a range from about 20 psi to about 25 psi, or about 22 psi, all when measured in 80:20 methanol water solution.

The membranes described herein provide improved flow characteristics for use in venting, degassing, and membrane distillation processes. Stretching the PE or UPE membranes significantly increases the air permeability, as measured by air permeability, but does not lead to a correspondingly large increase in pore size. Modifying the surface of the membrane with hydrophobic monomers yields a membrane that is more hydrophobic. The membranes also retain their structural integrity, which is important when membranes are subjected to pressure. Additionally, the resulting grafted PE or UPE membranes can be sterilized upon exposure to gamma radiation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
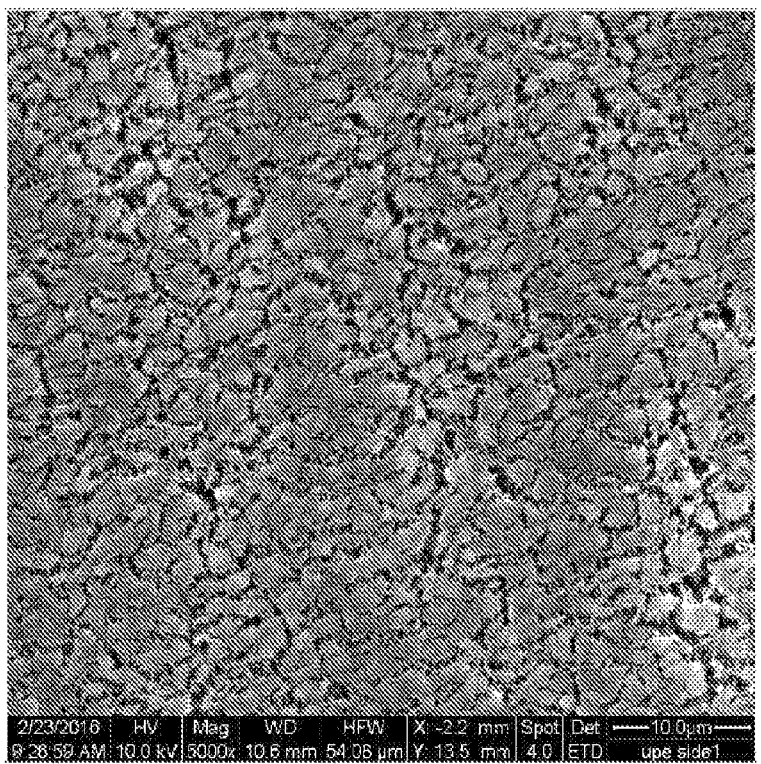
FIGS. 1A-B are respective scanning electron microscopy (SEM) images of an unstretched (FIG. 1A) and stretched (FIG. 1B) symmetric UPE membrane. 5000× magnification used in both FIGS. 1A-B.

While this invention will be particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "membrane" is a reference to one or more membranes and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A description of example embodiments of the invention follows.

Vent membranes in embodiments of the disclosure include gamma radiation stable porous polymeric membranes with perfluorinated monomer modifying one or more surfaces of the porous membrane. These vent membranes are hydrophobic and are bacterial retentive. In some embodiments of the disclosure, the vent membranes include a stretched porous polyethylene membrane with perfluorinated monomer modifying one or more surfaces of the polyethylene membrane. These vent membranes are hydrophobic, can be sterilized with gamma radiation, are bacterial retentive, and have higher air permeability than the unstretched polyethylene membrane.

In order to produce membranes having improved performance characteristics and hydrophobicity, gamma stable porous polymeric membranes like UPE membranes are modified in two ways. First, the membranes can be stretched, which improves the air permeability properties without substantially increasing the pore size of the membrane. In particular, a stretched UPE membrane has a demonstrated order of magnitude increase in the air permeability compared to an unstretched UPE membrane, as determined in by an air permeability test as described in the General Experimental section. Notably, this significant increase in air permeability was not accompanied by a similar decrease in the visual bubble point, which is a test to assess the pore size of a membrane that is also described in the General Experimental section. In one example embodiment, the air permeability improved from about 0.49 standard liters per minute/cm$^2$ (membrane area) for an unstretched UPE membrane to about 5.9 standard liters per minute/cm$^2$ for a stretched UPE membrane. In the same example embodiment, the visual bubble point of the stretched UPE membrane measured in 60:40 IPA water solution decreased from about 32 psi (221 kPa) to about 19 psi (131 kPa). In another example embodiment, stretching increased the air permeability from about 1.97 slpm/cm$^2$ to about 9.4 slpm/cm$^2$, while only decreasing the visual bubble point measured in 60:40 IPA water solution from about 19 psi to about 12 psi.

Second, the surface of the membranes can be modified with monomers to decrease the membrane surface energy, which corresponds to an increase in hydrophobicity. In one particular example embodiment, a grafted UPE membrane has a surface energy that is lower than PTFE, which is a highly hydrophobic membrane.

Typically, the membranes are first stretched, and then monomers are grafted to the surface of the membrane. However, it is also possible to first graft monomers onto the membrane and then stretch the membrane.

The surface modified polyethylene porous membranes described herein have properties that are particularly useful for venting, degassing, and membrane distillation processes. Notably, the membranes provide a high air permeability, thus facilitating the flux of air or other gases across the membrane. The membranes also have a low surface energy, such that they are hydrophobic, typically equal or more hydrophobic than a PTFE membrane. In addition, the membranes have a liquid intrusion pressure that is equal or higher than the liquid intrusion pressure of a 0.2 micron PTFE membrane.

In some versions, the vent membranes have an air permeability in a range of about 4.9 slpm/cm$^2$ to about 9.4 slpm/cm$^2$ when measured at about 10 psi (69 kPa). In other embodiments, the membranes have an air permeability in a range of about 4.9 slpm/cm$^2$ to about 6.1 slpm/cm$^2$ when measured at about 10 psi (69 kPa). In other versions, the membranes have an air permeability of about 5.4 slpm/cm$^2$ when measured at about 10 psi (69 kPa). The air permeability can be assessed in accordance with the air permeability test described in the General Experimental section.

In some versions, the membranes have a surface energy in a range of about 15 to about 25 dyne/cm. In other versions, the membranes have a surface energy in a range of about 21 to about 23 dyne/cm. In yet another version, the membranes have a surface energy in a range of about 21.5 dyne/cm. Surface tension or surface energy can be assessed in accordance with the test described in Example 6.

In some versions, the membranes have a liquid intrusion pressure in a range of about 15 to about 25 psi measured in 80:20 methanol:water solution. In other versions, the membranes have a liquid intrusion pressure in a range of about 20 to about 25 psi when measured in 80:20 methanol:water solution. In yet another version, the membranes have a liquid intrusion pressure of about 22 psi when measured in 80:20 methanol:water solution. Liquid intrusion pressure can be assessed in accordance with the liquid intrusion pressure test described in Example 7$_{[A1]}$.

The polyethylene porous membranes that can be stretched and grafted to can include those that are stable to gamma radiation such that a dose of about 25 kGy gamma radiation changes the tensile strength of the stretched porous polyethylene membrane by less than about 60% in the machine direction and by less than about 70% in the cross web direction. In some embodiments the molecular weight of the polyethylene comprising the porous membrane can be greater than about 1,000,000 Daltons and less than about 6,000,000 Daltons.

A stretched porous polyethylene membrane can be identified by increased orientation of the polymer chains compared to the more amorphous unstretched porous polyethylene membrane. The increased orientation of the polymer chains or crystallinity can be measured by x-ray diffraction, or determined by differential scanning calorimetry (DSC) of the stretched porous membrane compared to the unstretched membrane. The increased orientation of the polymer chains or crystallinity of the stretch membrane can also be determined by the tensile strength of the material.

In embodiments of the disclosure the tensile strain at break of the membrane decreases after stretching by approximately a factor of about 8 MD and a factor of about 5.5 CW. In some embodiments the unstretched porous polyethylene membrane has a tensile stress in megapascals of about 10 MPa to about 14 MPa and a tensile strain in millimeters per millimeter of about 4.3 mm/mm to about 5.5 mm/mm as measured in the machine direction and the unstretched membrane has a tensile stress in megapascals of about 6.5 MPa to about 8.5 MPa and a tensile strain in millimeters per millimeter of about 7.0 mm/mm to about 9.5 mm/mm measured in the cross web direction. In some embodiments the stretched porous polyethylene membrane has a tensile stress in megapascals of about 12 MPa to about 16 MPa and a tensile strain in millimeters per millimeter of about 0.5 mm/mm to about 0.9 mm/mm as measured in the machine direction and the vent membrane has a tensile stress in megapascals of about 6 MPa to about 8.5 MPa and a tensile strain in millimeters per millimeter of about 1.0 mm/mm to about 1.8 mm/mm measured in the cross web direction.

Gamma radiation treatment of porous membranes, vent membranes, and vent filters disclosed herein can be at a dose of about 25 kGy, or a dose of more than about 25 kGy. In some embodiments the vent membranes can have a tensile stress in megapascals of about 8 MPa to about 12 MPa and a tensile strain in millimeters per millimeter of about 0.2 mm/mm to about 0.3 mm/mm as measured in the machine direction, and the vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of the vent membrane with a dose of gamma rays of at least about 25 kGy. The high tensile stress and tensile strain of the vent membrane, especially following gamma treatment, is advantageous and provides for integral vent membranes during use where flexing of the vent membrane can occur which can lead to vent membrane failure, sample contamination and process disruption.

The pore size of the vent membranes and vent filters in embodiments of the invention can be characterized by bacterial retention or bubble point of the membrane. Vent membranes in embodiments disclosed herein have a bacterial retention as measures the filter's ability to sterilize fluid and pass the test described in ASTM F838-05 (2013)(incorporated herein by reference in its entirety and also as described in Example 8). For example, in the Standard Test Method for Determining Bacterial Retention of Membrane Filters Utilized for Liquid Filtration, the filter can retain a minimum of $1\times10^7$ colony forming units (cfu) per $cm^2$ of a challenge bacteria (usually B. diminuta). Vent membranes in embodiments of the disclosure can include those that in addition to bacterial retention, also have a visual bubble point in 60% IPA in 40% deionized water (v/v) of about 12 pounds per square inch (psi) to less than about 32 pounds per square inch (psi). In some embodiments, the bubble point of the vent membrane is between about 12 psi to about 19 pounds per square inch.

In some embodiments the base, unmodified porous membranes are ultra-high molecular weight polyethylene membranes (also referred to as UHMWPE membranes or UPE membranes). Polyethylene membranes, and in particular UPE, are advantageous because the air permeability of a UPE membrane can be significantly improved by stretching the membrane biaxially to increase the air permeability by an order of magnitude or by a factor of about 4 to about 12, compared to its unstretched counterpart while not significantly weakening the membrane as determined by the tensile stress and tensile strain of the membrane. While the air permeability is significantly changed, the membrane advantageously retains its relatively small pores size compared to its unstretched counterpart. Retaining small pores prevents bacteria from crossing the membrane during use.

In the claims and specification, reference to a "polyethylene membrane" and "PE" in embodiments of the disclosure is a reference to a porous polyethylene membrane with an IPA bubble point between about 10 psi to about 40 psi that has a molecular weight between about 100,000 Daltons to about 9,000,000 Daltons. Reference to an "ultra high molecular weight polyethylene membrane" or "UPE membrane" in embodiments of the disclosure is a reference to a porous ultrahigh molecular weight polyethylene membrane with an IPA bubble point between about 10 psi to about 40 psi that has a molecular weight of from about 1,000,000 Daltons to about 9,000,000 Daltons. Porous polyethylene membranes with an IPA bubble point between about 10 psi to about 40 psi that have molecular weights less than those of UPE can be described by their molecular weight or molecular weight range, for example less than about 1,000,000 Daltons or from about 100,000 Daltons to about 400,000 Daltons. The molecular weight for various polyethylenes including UPE can be determined viscometrically in accordance with test method ASTM D4020-05 by measuring intrinsic viscosity [IV] and converting this value by means of the Mark-Houwink equation $M=K[IV]^\alpha$, where for ASTM D4020-5 the constant K is 53,700, $\alpha$ is 1.37 and M has units of gram per molecule and IV has units of deciliter per gram (also see for example H. L Wagner, J. Phys. Chem. Ref. Data Vol. 14, No. 2, 1985). For UPE with an intrinsic viscosity of between about 16 deciliter per gram (dL/g) to about 20 dL/g, the molecular weight range is about 2.4 million to about 3.3 million using the ASTM D4020-5 method and Mark-Houwink equation.

UPE membranes are typically formed from a resin having a molecular weight greater than about 1,000,000. In some embodiments the molecular weight of the UPE is in a range from about 2,000,000 Daltons to about 9,000,000 Daltons. While examples and embodiments herein are described with reference to UPE, the principles are equally applicable to polyethylene membranes that are below the UPE cutoff value of about 1,000,000 Daltons.

To make a polyethylene membrane, first a polymer like UPE is extruded and formed into a porous membrane. In one embodiment, UPE of approximately 2 million to 4 million molecular weight is combined with solvents, for example mineral oil and dioctyl phthalate forming a slurry of approximately 10-20% solids composition. In another embodiment UPE could be combined with solvents such as mineral oil and dibutyl sebacate with solids compositions as low as 12% or as high as 19% solids. The slurry is placed inside an extruder, such as a single screw or a twin screw extruder, and the UPE is processed into a viscous mass (e.g., a gel or emulsion) with a temperature ranging anywhere between 190° C. and 275° C. Next the viscous mass is drawn through a die, which results in the formation of a thick tape or film. The film is then quenched on a temperature controlled revolving drum with a temperature between 80° C. and 110° C. The process of quenching the film takes it from a gelled, viscous mass, to a solid that can be handled as a web. The rotational speed of the drum can be varied such that the linear velocity of its circumference is between 5 and 25 fpm. At this stage of the process, the membrane structure is at least partially formed; however the solvent may still be present within the pore structure and in the polymer matrix, allowing for greater polymer chain mobility. After the quench drum, downstream vacuum rollers, rubber rollers or nip rollers could stretch the membrane anywhere from 0-200% in the machine direction. The final thickness of the membrane in this step may be from 20 μm to 100 μm.

After the membrane is formed the solvent is removed, such as by evaporation or extraction, yielding a base membrane. In some versions, a pore former remains in the UPE until further stretching process is completed.

The UPE membranes described herein can have a variety of geometric configurations, such as a flat sheet, a corrugated sheet, a pleated sheet, and a hollow fiber, among other. The membrane can be supported or unsupported by webs, nets, and cages, among others. The membrane support can be isotropic or anisotropic, skinned or unskinned, symmetric or asymmetric, any combination of these or can be a composite membrane including one or more retentive layers and one or more support layers. The vent membranes in various embodiments can be bonded or secured to a gamma radiation stable housing or other support by fusion bonding, bonding with a chemically compatible adhesive, or attached using a mechanical seal such as an o-ring or gasket. The housing can have a fluid inlet and a fluid outlet and the vent membrane bonded to the housing fluidly separates inlet and outlet of the housing. The vent membrane bonded to the housing is integral. In some embodiments the vent membrane bonded to the housing or support is integral (no pin holes) and has one or more or all of: a tensile stress in megapascals of about 8 MPa to about 12 MPa and a tensile strain in millimeters per millimeter of about 0.2 mm/mm to about 0.3 mm/mm as measured in the machine direction, and the vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of the vent membrane with a dose of gamma rays of at least about 25 kGy, can have an air permeability in a range from about 4.9 slpm/cm$^2$ to about 9.4 slpm/cm$^2$ when measured at about 10 psi, has a surface energy in a range from about 15 dyne/cm to about 25 dyne/cm, has a liquid intrusion pressure in a range from about 5 psi to about 25 psi when measured in 80:20 methanol solution, and is bacterial retentive as determined by of ASTM F838-05/R (2013).

In one example of an asymmetric membrane, the pore size on one face and region of the membrane is larger than on the opposing face and region. In another example, asymmetric structures can exist where the pore size on the opposing faces (and regions) of the membrane are larger while a central region of the membrane has a smaller pore size than either of the faces (e.g., an hour glass). In other versions the membrane can have an essentially symmetric pore structure across its thickness (substantially the same pore size across the thickness of the membrane).

In one aspect, to enhance the air permeability of a polyethylene membrane such as a UPE membrane, the membrane can be stretched further after extraction. In some embodiments, a membrane can be stretched in the machine direction (lengthwise), the transverse direction (across the width of the membrane) or both. Stretching in one direction is often referred uniaxial stretching whereas stretching in two directions is generally referred to as biaxial stretching. Usually, though not necessarily, the machine and transverse directions are perpendicular to each other.

During the stretching process, the polyethylene or UPE membrane is typically heated, which improves the stretching process. The temperature to which the membrane is heated can be different for stretching along the machine direction and transverse direction. Typically, the PE or UPE membrane is heated to between about 80° C. and about 120° C., for example about 100° C., with stretching in both the machine and transverse directions.

After pre-heating as described in the preceding paragraph, the membrane can be stretched between two series of nip rollers (also referred to as closed rollers). The speed of the second nip roller is typically higher than the speed of the first nip roller, which promotes stretching of the membrane. Stretching through the nip roller stretches the membrane in the machine direction, which increases the length of the membrane and decreases the width of the membrane. In some embodiments, the membrane is stretched by a factor of about 2 to about 8 times in the machine direction. In other embodiments, the membrane is stretched by a factor of about 2 to about 5 times in the machine direction. In yet other embodiments, the membrane is stretched by a factor of about 2 to about 2.5 times in the machine direction. In some embodiments, the membrane is stretched by a factor of about 1.7 to about 8 times in the machine direction. In other embodiments, the membrane is stretched by a factor of about 1.7 to about 5 times in the machine direction. In yet other embodiments, the membrane is stretched by a factor of about 1.7 to about 2.5 times in the machine direction.

Next, the membrane is stretched in the transverse direction (also referred to as the cross web direction) by feeding the membrane into a tenter by clips traveling in the machine direction. The clips travel through a pre-heated oven and then travel through a stretch zone oven in a V shape, which increases the width of the membrane. As one example, the pre-heating oven is about 100° C. and the stretch zone is about 105° C. Next, the membrane travels through the annealing zone, where the clips remain in parallel. The temperature of the annealing zone is generally about five to about fifteen degrees Celsius higher than the stretching zone, but at least about five degrees Celsius below the melting point of the polymer. In some embodiments, the membrane is stretched by a factor of about 2 to about 8 times in the transverse direction. In other embodiments, the membrane is stretched by a factor of about 2 to about 5 times in the machine direction. In yet other embodiments, the membrane is stretched by a factor of about 2.5 to about 3.5 times, or about 3 times, in the machine direction. In yet other embodiments, the membrane is stretched by a factor of about 3 times in the machine direction. In some embodiments, the membrane is stretched by a factor of about 1.7 to about 8 times in the transverse direction. In other embodiments, the membrane is stretched by a factor of about 1.7 to about 5 times in the machine direction. In yet other embodiments, the membrane is stretched by a factor of about 2.5 to about 3.5 times, or about 3 times, in the machine direction.

In embodiments where uniaxial stretching is employed, the stretching may occur in the machine direction at ranges of about 18-120° C. between a series of draw rollers, nip rollers or vacuum rollers. In some embodiments, stretching may occur at room temperature (roughly 18-22° C.). The speed of the second draw roller is typically higher than the speed of the first nip roller, which promotes stretching of the membrane. Stretching through the rollers stretches the membrane in the machine direction, which increases the length of the membrane and can decreases the width or thickness of the membrane. In some embodiments, the membrane is stretched by as much as factor of about 0.5 to about 80-50%, times in the machine direction. Furthermore, the tension of the web can be controlled such that further stretching on the order of 0-25% can be achieved.

The speed of the membrane through the machine and transverse direction stretchers can be varied and different speeds will result in different amounts of stretching in the machine and transverse directions. The stretching operations can be performed multiple times in each direction, for example, two times, three times, or more in each direction. In one embodiment, the membrane is first stretched in the machine direction to the desired fraction, and then in the transverse direction to the desired fraction.

After stretching an annealing process may be performed to heat set the membrane and provide for greater dimensional stability. The annealing process can heat the web between 100° C. to as high as 135° C. Based on the speed of the process the residence time heating the membrane can be between approximately 0.5 min and as high as 5 minutes.

Polyethylene membranes and UPE membranes are porous in embodiments disclosed herein and have a post-stretching thickness in a range of about 6 microns and about 40 microns, or from about 20 microns to about 40 microns. In preferred embodiments, the UPE membrane has a post-stretching thickness in a range of about 25 microns and about 35 microns, or in a range of about 27 microns and about 30 microns. Thinner membranes have less pressure loss across the membrane, which contributes to an improved air permeability. The thickness of the stretched membrane is highly dependent on the starting thickness of the membrane and stretching ratio. Thus, thinner stretched membranes can be made by starting with a thinner membrane.

The inventors have discovered that stretching polyethylene porous membrane or a UPE porous membrane in various embodiments can significantly increase air permeability without causing a significant increase in the pore size of the membrane. Stretching the membrane decreases the apparent density of the polyethylene membrane or UPE membrane in accordance with Formula (I). A stretched PE or UPE membrane for example has higher porosity, and therefore lower apparent density compared to an unstretched PE or UPE membrane.

$$\text{Apparent density} = \text{weight}/(\text{area} \times \text{thickness}) \quad (I)$$

The hydrophobicity of the vent membranes can be increased by surface modifying the gamma stable porous membranes, such as polyethylene porous membranes or UPE membranes, with hydrophobic monomers. In some embodiments the hydrophobicity of the polyethylene or UPE membranes can be increased by grafting hydrophobic monomers onto the surface of the polyethylene or UPE membranes. Grafting refers to chemically linking a moiety, such as a monomer or other molecule, to polymeric porous membrane surfaces, including inner pore surfaces, of a porous membrane. In other embodiments other hydrophobic monomers for coating, rather than grafting, the porous PE or UPE membranes can be utilized. The hydrophobic monomers are capable of being polymerized by free radical polymerization and can be cross-linked to provide a polyethylene or UPE membrane, for example, being directly coated, as opposed to grafted, on the membrane's entire surface with a cross-linked polymer formed from the hydrophobic monomer and a crosslinking agent. The monomer and cross linker can be polymerized with energy from an energy source such as an ultraviolet lamp and the surface modified porous membrane has essentially the same, within 10% or less, of the air permeability of the uncoated membrane.

The monomers that are grafted are fluorinated monomers, preferably perfluorinated monomers, both of which decrease the surface energy of the membrane. A decrease in surface energy corresponds to an increase in the hydrophobicity of the membrane. Perfluorinated compounds are organofluorine compounds containing only carbon-fluorine bonds, carbon-carbon bonds, and may contain other heteroatoms. Fluorinated compounds may contain some carbon-hydrogen bonds. The fluorinated and perfluorinated monomers have a straight or branched carbon backbone ranging, for example, from one to twenty carbons. Monomers having more carbons in the backbone, and monomers having a greater number of fluorine substituents will result in a grafted membrane having decreased surface energy.

In some embodiments, the monomers that are grafted are perfluoroacrylate monomers. In some embodiments, the monomers are perfluoro-n-alkyl acrylate monomers. The term "alkyl," as used herein, refers to both a saturated aliphatic branched or straight-chain monovalent hydrocarbon radical having the specified number of carbon atoms and substituted with at least one fluorine atom, and preferably perfluorinated. Examples of suitable alkyls include, for example, n-propyl, i-propyl, n-butyl, i-butyl, sec-butyl, t-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosadecyl, 2-methylbutyl, 2-methylpentyl, 2-ethylbutyl, 3-methylpentyl, 4-methylpentyl. In a preferred embodiment, the monomer is perfluoro-n-octyl acrylate.

In order to graft monomers onto a polyethylene membrane or a UPE membrane, the membrane is wet with an alcohol, such as isopropyl alcohol (IPA). The alcohol wetting solution can include a type II photoinitiator, such as benzophenone. Next, the membrane is soaked in a grafting solution (detailed below in the examples in wt %). In one embodiment, the grafting solution contains perfluoro-n-octyl acrylate dissolved in decamethyltrisiloxane. The monomers are insoluble in water, and suitable solvents will sufficiently dissolve the monomers without dissolving the benzophenone that is deposited onto the membrane One such suitable solvent is decamethyltrisiloxane. Excess grafting solution can be removed from the porous membrane by squeezing the membrane using a roller (or similar treatment). The impregnated membrane is then exposed to electromagnetic radiation or another suitable energy source to graft the moieties onto the porous polymeric membrane surfaces, including inner pore surfaces. The electromagnetic radiation can be within the ultraviolet portion of the spectrum or, in some instances, can range from about 200 nm to about 600 nm. After exposure to electromagnetic radiation, the membrane can be washed, for example, in deionized (DI) water and then washed again in methanol. After washing, the membrane can be dried in an oven at about 50° C. for about 5 to about 15 minutes.

Grafting hydrophobic monomers onto a polyethylene membrane or a UPE membrane reduces the surface energy of the membrane. The change in surface energy correlates with the amount of monomers grafted onto the membrane. Increasing the concentration of the monomers in the grafting solution increases the amount of monomers grafted onto the PE or UPE membrane. Decreasing and increasing the duration to which the membranes are exposed to electromagnetic radiation contributes to decreases and increases, respectively, of the extent of monomer grafting onto the PE or UPE membrane. Increasing and decreasing the intensity of the electromagnetic radiation can also increase and decrease, respectively, the amount of grafting. Varying the monomer concentration in the grafting solution, the duration of exposure to electromagnetic radiation, and the intensity of the electromagnetic radiation can therefore alter the amount of monomers grafted, and, therefore, the surface energy of the grafted membrane.

A porosimetry bubble point test method measures the pressure required to push air through the wet pores of a membrane. A bubble point test is a well-known method for determining or characterizing the pore size of a membrane.

Bubble point can be determined by mounting a disk, such as a 47 mm disk, of a dry membrane sample in a holder. A small volume of 60:40 IPA:water mixture is placed on the upstream side of the membrane to wet the membrane. The pressure is then increased gradually to push air through the pores of the membrane. The visual bubble point of the membrane is measured from the minimum pressure required to displace 60% IPA from at least one pore of the wet membrane.

Surface energy, which is also the same as surface tension, represents the force per unit length, and is typically described as the force in dynes required to break a film of about 1 cm length (e.g., dyne/cm). For membranes, a higher surface energy means that the membrane is more hydrophilic (or less hydrophobic), and a lower surface energy means that the membrane is less hydrophilic (or more hydrophobic). All surface energy values reported herein are determined at room temperature, unless otherwise stated. The grafted membranes typically have a lower surface energy than the ungrafted membranes.

Membranes of this disclosure are housed in an appropriate apparatus depending upon the intended use. Examples of suitable devices for venting are described in U.S. Pat. Nos. 8,852,324 and 8,430,114. Examples of suitable devices for degassing are described in U.S. Pat. No. 5,053,060. Examples of suitable devices for membrane distillation are described in U.S. Patent Publication No. 2011/0132826 A1. Each of the different applications has different pore size requirements, as understood by the skilled person.

Exemplary embodiments include the following:

Embodiment 1. A grafted, porous, polyethylene membrane, comprising:
 a) an air permeability in a range from about 4.9 slpm/cm$^2$ to about 9.4 slpm/cm$^2$ when measured at 10 psi;
 b) a surface energy in a range from about 15 dyne/cm to about 25 dyne/cm;
 c) a liquid intrusion pressure in a range from about 5 psi to about 25 psi when measured in 80:20 methanol:water solution; and
 d) a perfluorinated monomer grafted to one or more surfaces of the membrane.

Embodiment 2. The membrane of embodiment 1, wherein the perfluorinated monomer is a perfluoro-n-alkyl acrylate.

Embodiment 3. The membrane of embodiment 1, wherein the perfluorinated monomer is perfluoro-n-octyl acrylate.

Embodiment 4 The membrane of embodiment 1, wherein the air permeability is in a range from about 4.9 slpm/cm$^2$ to about 6.1 slpm/cm$^2$ when measured at 10 psi.

Embodiment 5. The membrane of embodiment 1, wherein the air permeability is about 5.4 slpm/cm$^2$ when measured at 10 psi.

Embodiment 6. The membrane of embodiment 1, wherein the surface energy is in a range from about 21 dyne/cm to about 23 dyne/cm Embodiment 7. The membrane of embodiment 1, wherein the surface energy is about 21.5 dyne/cm.

Embodiment 8. The membrane of embodiment 1, wherein the liquid intrusion pressure is in a range from about 20 psi to about 25 psi when measured in 80:20 methanol:water solution.

Embodiment 9 The membrane of embodiment 1, wherein the liquid intrusion pressure is about 22 psi when measured in 80:20 methanol:water solution.

Embodiment 10. The membrane of Claim 1, wherein the air permeability is about 5.4 slpm/cm$^2$ when measured at 10 psi, the surface energy is about 21.5 dyne/cm, and the liquid intrusion pressure is about 22 psi when measured in 80:20 methanol:water solution.

Embodiment 11. The membrane of embodiment 1, wherein the membrane is bacterial retentive.

Embodiment 12. The membrane of embodiment 1, wherein the membrane is uniaxially stretched or biaxially stretched.

Embodiment 13. The membrane of embodiment 1, wherein the membrane exhibits R absorption corresponding to an ester group and corresponding to carbon-fluorine stretches.

Embodiment 14. The membrane of claim 13, wherein the IR absorption corresponding to the ester group is at about 1760 cm$^{-1}$.

Embodiment 15. The membrane of embodiment 13, wherein the IR absorption corresponding to carbon-fluorine stretches is between about 1289 cm$^{-1}$ and about 1114 cm$^{-1}$.

Embodiment 16 The membrane of embodiment 13, wherein area of the ester group divided by the total peak area corresponding to polyethylene stretch is about 0.024.

Embodiment 17. A method of making a surface modified, porous, polyethylene membrane, comprising:
 a) contacting a polyethylene membrane with an alcohol solution comprising benzophenone;
 b) contacting the polyethylene membrane with a grafting solution to surface modify the membrane comprising:
  i) a perfluorinated monomer; and
  ii) decamethyltrisiloxane; and
 c) exposing the membrane to electromagnetic radiation, thereby resulting in a surface modified, porous ultra-high molecular weight polyethylene membrane.

Embodiment 18. The method of embodiment 17, wherein the perfluorinated monomer is a perfluoro-n-alkyl acrylate.

Embodiment 19. The method of embodiment 17, wherein the perfluorinated monomer is perfluoro-n-octyl acrylate.

Embodiment 20. The method of embodiment 17, wherein the surface modified, porous, ultra-high molecular weight polyethylene membrane has an air permeability in a range from about 4.9 slpm/cm$^2$ to about 9.4 slpm/cm$^2$ when measured at 10 psi.

Embodiment 21. The method of embodiment 17, wherein the surface modified, porous, ultra-high molecular weight polyethylene membrane has a surface energy in a range from about 15 dyne/cm to about 25 dyne/cm.

Embodiment 22. The method of embodiment 17, wherein the surface modified, porous, ultra-high molecular weight polyethylene membrane has a liquid intrusion pressure in a range from about 5 psi to about 25 psi when measured in 80:20 methanol:water solution.

Embodiment 23. A polyethylene membrane having an air permeability in a range from about 5.9 slpm/cm$^2$ to about 9.4 slpm/cm$^2$ when measured at 10 psi and a bubble point in a range from about 12 psi to about 19 psi, wherein the polyethylene membrane has a molecular weight in a range from about 2,000,000 Daltons to about 9,000,000 Daltons.

Embodiment 24. A method of venting, comprising flowing a gas across a polyethylene membrane surface modified according to any of the preceding claims.

Embodiment 25. A method of degassing, comprising allowing vapor to diffuse across a polyethylene membrane surface modified according to any of the preceding claims.

Embodiment 26. A method of membrane distillation, comprising allowing vapor to pass across a polyethylene membrane surface modified according to any of the preceding claims.

Embodiment 27. A vent membrane comprising: a stretched porous polyethylene membrane and perfluorinated monomer modifying one or more surfaces of the stretched porous polyethylene membrane; said vent membrane is bacterial retentive as determined by ASTM F838-05 and has:
- e) an air permeability in a range from about 4.9 slpm/cm$^2$ to about 9.4 slpm/cm$^2$ when measured at 10 psi, and
- f) a surface energy in a range from about 15 dyne/cm to about 25 dyne/cm.

Embodiment 28. The vent membrane of embodiment 27, said vent membrane has a tensile stress in megapascals of about 8 MPa to about 12 MPa and a tensile strain in millimeters per millimeter of about 0.2 mm/mm to about 0.3 mm/mm as measured in the machine direction, and said vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of said vent membrane with a dose of gamma rays of at least about 25 kGy.

Embodiment 29. The vent membrane of any of embodiments 27 to 28, wherein the stretched porous polyethylene membrane is biaxially stretched.

Embodiment 30. The vent membrane of any of embodiments 27 to 29, wherein the stretched porous polyethylene membrane is an ultrahigh molecular weight polyethylene.

Embodiment 31 The vent membrane of any of embodiments 27 to 30, wherein the perfluorinated monomer comprises a perfluoro-n-alkyl acrylate.

Embodiment 32. The vent membrane of any of embodiments 27 to 31, wherein said vent membrane with perfluorinated monomer modifying one or more surfaces of the stretched porous polyethylene membrane has a surface energy in a range from 21 dyne/cm to 23 dyne/cm.

Embodiment 33. The vent membrane of any of embodiments 27 to 32, wherein said stretched porous polyethylene membrane prior to gamma radiation treatment has a tensile stress in megapascals of about 12 MPa to about 16 MPa and a tensile strain in millimeters per millimeter of about 0.5 mm/mm to about 0.9 mm/mm as measured in the machine direction, and said stretched polyethylene membrane has a tensile stress in megapascals of about 6 MPa to about 8.5 MPa and a tensile strain in millimeters per millimeter of about 1.0 mm/mm to about 1.8 mm/mm measured in the cross web direction.

Embodiment 34. A vent filter comprising the vent membrane of any of embodiments 27 to 33, wherein the vent membrane is secured to a housing.

Embodiment 35. A method of making a vent membrane, comprising:
a) wetting a porous polyethylene membrane with a solution comprising benzophenone, the stretched porous polyethylene membrane has a tensile stress in megapascals of about 12 MPa to about 16 MPa and a tensile strain in millimeters per millimeter of about 0.5 mm/mm to about 0.9 mm/mm as measured in the machine direction and said stretched polyethylene membrane has a tensile stress in megapascals of about 6 MPa to about 8.5 MPa and a tensile strain in millimeters per millimeter of about 1.0 mm/mm to about 1.8 mm/mm measured in the cross web direction;
b) contacting the stretched polyethylene membrane with a grafting solution comprising:
   i) a perfluorinated monomer; and
   ii) decamethyltrisiloxane; and
c) exposing the membrane to electromagnetic radiation, and grafting monomer to the porous polyethylene membrane.

Embodiment 36. The vent membrane of embodiment 35, wherein the porous polyethylene membrane is biaxially stretched.

Embodiment 37. The vent membrane of any of embodiments 35 to 36, wherein the porous polyethylene membrane is an ultrahigh molecular weight polyethylene.

Embodiment 38. The vent membrane of any of embodiments 35 to 37, wherein the perfluorinated monomer comprises a perfluoro-n-alkyl acrylate.

Embodiment 39. A vent membrane made by the method of any of embodiments 35 to 38, said vent membrane is bacterial retentive as determined by ASTM F838-05 and has:
- g) an air permeability in a range from about 4.9 slpm/cm$^2$ to about 9.4 slpm/cm$^2$ when measured at 10 psi; and
- h) a surface energy in a range from about 15 dyne/cm to about 25 dyne/cm.

Embodiment 40. The vent membrane of embodiment 39, said vent membrane has a tensile stress in megapascals of about 8 MPa to about 12 MPa and a tensile strain in millimeters per millimeter of about 0.2 mm/mm to about 0.3 mm/mm as measured in the machine direction and said vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of said vent membrane with a dose of gamma rays of at least about 25 kGy.

Embodiment 41. A vent membrane comprising: a gamma radiation stable porous polymer membrane and perfluorinated monomer modifying one or more surfaces of the porous polymer membrane; said vent membrane is bacterial retentive as determined by ASTM F838-05 and has:
- i) an air permeability in a range from about 4.9 slpm/cm$^2$ to about 9.4 slpm/cm$^2$ when measured at 10 psi;
- j) a surface energy in a range from about 15 dyne/cm to about 25 dyne/cm; and a tensile strain in millimeters per millimeter of about 0.2 mm/mm to about 0.3 mm/mm as measured in the machine direction and said vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of said vent membrane with a dose of gamma rays of at least about 25 kGy.

EXAMPLES

General Experimental: Membrane Stretching

The UPE membrane is preheated at 100° C. Then, the pre-heated membrane is stretched in the machine direction (lengthwise) with two nips (closed roller). The speed of each successive nip is greater than the speed of the preceding nip. Thus if the speed of each nip increases by a factor of 1.4, the speed of the second nip will be increased by a factor of 1.4*1.4=1.96. The membrane is then cooled to about 60° C. to 70° C. through two more rollers. As the membrane exits the machine direction stretching section, the length of the membrane approximately doubles, and the width of the membrane reduces from approximately 12 inches (30.5 cm) to approximately 9.5 inches (24.1 cm).

The membrane that has been stretched in the machine direction is then fed into a cross web direction stretcher, also referred to as a tenter. The membrane is feed into the tenter by clips traveling in the machine direction. The clips travel through 10 feet (3.0 meters) of pre-heated oven, and then the clips travel in the stretch zone oven in a V shape thus expanding the membrane in the cross direction. The temperature of the pre-heated oven is about 100° C., and the temperature of the stretch zone is about 105° C. Next, the membrane travels in the annealing zone where the clips remain in parallel. The annealing zone temperature is set at 5 to 15 degrees Celsius above the stretching zone but at least 5 degrees Celsius below the melting point of the polymer. The stretching operation runs about 3 feet (0.9 meter) to 10 feet (3.0 meters) per minute depending on the stretching ratio.

General Experimental: Visual Bubble Point

The visual bubble point test method measures the pressure required to push air through the wet pores of a membrane.

The test was performed by mounting a 47 mm disk of a dry membrane sample in a holder. The holder is designed to allow the operator to place a small volume of 60:40 IPA: water mixture on the upstream side of the membrane to wet the membrane. The pressure is then increased gradually to push air through the pores of the membrane. The visual bubble point of the membrane is measured from the minimum pressure required to displace 60% IPA from at least one pore of the wet membrane.

General Experimental: Air Permeability

Air permeability was determined by placing a dry 47 mm membrane disk in a holder and recording the air permeability in standard liters per minute (slpm) at 10 psi (69 kPa) using a flow meter and calculating the permeability in slpm/cm$^2$.

Example 1

Example 1 illustrates the effect of stretching a UPE membrane having a 0.1 micron rated pore size (92 micron thick). The membrane visual bubble point and air permeability were determined. For comparison, the visual bubble point and air permeability of a 0.2 micron polytetrafluoroethylene (PTFE) membrane (40 micron thick) and a 0.2 micron polyvinylidene fluoride (PVDF) (115 micron thick) membrane were also ascertained.

A 92 micron thick membrane sample was stretched by a factor of 2 in the machine and cross web directions to a thickness of 30 micron. Membrane visual bubble point and air permeability were measured as described in the general experimental section. The results of this experiment are shown in Table 1, which indicates that membrane visual bubble point decreases from 32 psi to 19 psi upon stretching while air permeability increases by a factor of 12 from 0.49 (slpm/cm$^2$) to 5.9 standard liter per minute per area (slpm/cm$^2$) at 10 psi (see Table 1, UPE 0.1 micron and UPE 0.1 micron stretched 2×2). The stretched UPE membrane has superior air permeability compared to a 0.2 micron rated PTFE and PVDF membranes.

TABLE 1

Visual bubble point and air permeability of membranes.

| Sample | Visual BP in 60% IPA (psi) | Air permeability (slpm/cm$^2$) |
|---|---|---|
| PTFE 0.2 μm | 23 | 1.55 |
| PVDF 0.2 μm | 19 | 0.74 |
| UPE 0.1 μm | 32 | 0.49 |
| UPE 0.1 μm stretched 2 × 2 | 19 | 5.9 |

Example 2

Example 2 illustrates the effect of stretching a UPE membrane having a 0.2 micron rated pore size on membrane visual bubble point and air permeability.

A 90 micron membrane sample was stretched by a factor of 3 in the machine direction and by a factor of 4 in the cross web direction to a resulting thickness of 27 micron. Membrane visual bubble point and air permeability were measured as described in the General Experimental section. The results of this experiment show that membrane visual bubble point decreased from 19 psi to 12 psi upon stretching while air permeability permeability at 10 psi increased from 1.97 to 9.4 slpm/cm$^2$.

Example 3

Example 3 describes the preparation of a Benzophenone solution 0.16 grams of benzophenone (99%, Sigma-Aldrich) were dissolved in 40 ml of isopropyl alcohol (IPA) to obtain 0.4 wt % benzophenone solution.

Example 4

Example 4 describes the preparation of a grafting solution containing perfluorinated monomer.

A solution was made containing 4 g perfluoro-n-octyl acrylate (97% Exfluor Research Corporation) and 36 g Decamethyltrisiloxane (97% sigma).

Example 5

Example 5 demonstrates the surface modification of a stretched UPE membrane.

A 47 mm disk of the stretched UPE membrane of Example 1 was wet for 25 seconds with the 0.4% benzophenone solution described in Example 3. The membrane disk was then dried at room temperature for 5 min. The dry membrane disk was then introduced into the grafting solution described in Example 4. The dish was covered and the membrane was soaked in the grafting solution for 2 minutes. The membrane disk was removed and placed between 1 mil polyethylene sheets. The excess solution was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 nm to 600 nm. Time of exposure is controlled by how fast the assembly moves through the UV unit. In this example, the assembly moved through the UV chamber at 7 feet per minute (2.1 meters per minute). After emerging from the UV unit, the membrane was removed from the sandwich and immediately placed in Methanol, where it was washed by swirling for 5 minutes. Following this washing procedure the membrane was dried on a holder in an oven operating at 50° C. for 10 min.

The resulting membrane had an air permeability at 10 psi of 5.44 slpm/cm$^2$ illustrating that the air permeability of the grafted porous membrane was substantially the same or within ±100% of the air permeability of the starting porous membrane.

Example 6

Example 6 demonstrates the surface energy of the modified, stretched UPE membrane of Example 5.

Surface energy of the surface modified stretched UPE membrane described in Example 5 was determined by adding a small volume of IPA:water solution on the membrane surface and examining which volume percent of IPA in water wets the membrane. The wetting solution causes the membrane surface to become translucent instantly after a small volume of the solution touches the membrane. The surface energy of the wetting solution is considered to be the surface energy of the membrane.

The results of this experiment are shown in Table 2. Only 100% IPA which has a surface energy of 21.22 dyne/cm, wets the surface modified stretched membrane. In comparison a 0.2 micron rated, unmodified PTFE membrane has a surface energy of 21.75 dyne/cm [Der Chemica Sinica, 2011, 2(6):212-221]. These results indicate that the surface modified, stretched UPE membrane is more hydrophobic than the PTFE membrane.

TABLE 2

Surface energy of membranes.

| Organic solvent (surface energy in dyne/cm) | Surface modified stretched UPE | stretched UPE | PTFE |
|---|---|---|---|
| 48% IPA in water (22.14 dyne/cm) | Does not wet | wets | Does not wet |
| 60% IPA in water (21.75 dyne/cm) | Does not wet | wets | wets |
| 100% IPA (21.22 dyne/cm) | Wets | wets | wets |

Example 7

Example 7 demonstrates the liquid intrusion pressure of the modified, stretched UPE membrane of Example 5.

A 47 mm disk of the modified stretched membrane from Example 5 was placed in a filter holder connected to a reservoir holding 100 ml of 80:20 methanol:water mixture. Using a pressure regulator connected to the reservoir, the pressure was increased gradually until the liquid passed from the upstream side to the downstream side of the membrane inside the filter holder. The minimum pressure required to push the liquid through the pores of the dry membrane is defined as the liquid intrusion pressure of the membrane.

The result of this experiment showed that the liquid intrusion pressure of the surface modified stretched membrane was 17 psi. In comparison, a 0.2 micron PTFE membrane had 6 psi liquid intrusion pressure. The result indicates that the surface modified stretched UPE is more resistant to wetting than PTFE, and therefore will be more resistant to wetting than PTFE when used in the application environment.

Example 8

Example 8 demonstrates the liquid bacterial retention of the stretched UPE membrane.

References: This study was conducted based upon the following references: ASTM International F838-05/R (2013) Standard Test Method for Determining Bacterial Retention of Membrane Filters Utilized for Liquid Filtration, which describes a protocol for assessing bacterial retention; ISO 10993-12, 2012, Biological Evaluation of Medical Devices—Part 12: Sample Preparation and Reference Materials, which specifies requirements for sample preparation; and ISO/IEC 17025, 2005, General Requirements for the Competence of Testing and Calibration Laboratories, which specifies requirements for calibration and testing.

General Procedure: Three (3) test article filters (SUPGP47000, prepared according to Example 2) along with three (3) positive control filters (HVHP047000, 0.45 micron PVDF membrane, expected not to retain bacteria at 100%), were pre-assembled in filter housing units. Prior to testing, all units were sterilized by gravity displacement steam sterilization (121° C. for 15 minutes), allowed to cool to ambient temperature, and the assembly was torqued to ensure a tight filter assembly seal. Test article and control filters were pre-wet with 70% filter sterilized isopropanol (IPA), followed by sterile deionized water (DI Water). Appropriate accessory items (tubing and collection vessels) were prepared (assembled and sterilized) for integration with house vacuum and testing of bacterial retention. The bacterial challenge of *Brevundimonas diminuta* (ATCC #19146) was prepared by streaking an aliquot from a frozen stock onto TSA agar plates. After incubation of streak, microorganisms were harvested with an inoculating loop into 10-20 mL of Nutrient Broth. The suspension was then adjusted using a spectrophotometer to a density of $>1\times10^7$ CFU/mL and confirmed by inoculation verification after serial dilution, plating on TSA, and incubation at 30-35° C. for approximately four (4) days. Samples were inoculated with three (3) mLs of bacterial challenge through the top entry port of the filter assemblies. The bacterial challenge was pulled through the filter samples under a house vacuum pressure of approximately six (6) psi. The filtrate was then recovered and assessed for the presence of *B. diminuta* (exhaustive recovery) by membrane filtration. Recovery filters were then transferred to Trypticase Soy Agar (TSA) plates and incubated at 30-35° C. for seven (7) days. Positive controls were challenged in an identical manner, while the recovered filtrate was assessed for bacterial retention after serial dilution and spread plating in duplicate. A single negative control was included for this Study in which sterile Nutrient Broth acted as the challenge media. Testing of Phosphate Buffered Saline (PBS), Nutrient Broth, and deionized water (used for pre-wetting) showed the media used for this Study was sterile (data not shown).

TABLE 3

Inoculation Verification - Colony Forming Units (CFU) per mL
Microorganism: *B. diminuta*

| Dilution Factor | CFU/Plate Replicate 1 | 2 | Average | CFU/mL |
|---|---|---|---|---|
| $10^{-1}$ | TNTC | TNTC | TNTC | N/A |
| $10^{-2}$ | TNTC | TNTC | TNTC | N/A |
| $10^{-3}$ | TNTC | TNTC | TNTC | N/A |
| $10^{-4}$ | 154 | 119 | 136.5* | $1.37 \times 10^7$ |
| $10^{-5}$ | 21 | 20 | 20.5 | N/A |
| $10^{-6}$ | 3 | 1 | 2 | N/A |
| $10^{-7}$ | 1 | 1 | 1 | N/A |

TNTC = Too Numerous to Count
N/A = Not Applicable
CFU/mL = Average CFU/plate × Plating Factor × Dilution Factor
*Values of countable viable colonies at lowest dilution are used for calculation

TABLE 4

Results Summary (after 7 Days incubation)

| Article | Sample | Rep. | MF | CFU/Dilution $10^{-2}$ | $10^{-3}$ | $10^{-3}$ | $10^{-4}$ | $10^{-5}$ | $10^{-6}$ | $10^{-7}$ | CFU/mL | % Retention | Average % Retention |
|---|---|---|---|---|---|---|---|---|---|---|---|---|---|
| HVHP047000 Control Article | 1 | 1 | | 13 | 2 | 1 | NOC | NOC | NOC | NOC | 1100 | 99.992 | 99.993 |
| | | 2 | | 9 | NOC | NOC | NOC | NOC | NOC | NOC | | | |
| | | Avg. | | 11 | 1 | 0.5 | 0 | 0 | 0 | 0 | | | |
| | 2 | 1 | | 10 | 2 | NOC | NOC | NOC | NOC | NOC | 950 | 99.993 | |
| | | 2 | | 9 | NOC | NOC | NOC | NOC | NOC | NOC | | | |
| | | Avg. | | 9.5 | 1 | 0 | 0 | 0 | 0 | 0 | | | |
| | 3 | 1 | | 14 | 2 | 1 | NOC | NOC | NOC | NOC | 950 | 99.993 | |
| | | 2 | | 5 | 1 | NOC | NOC | NOC | NOC | NOC | | | |
| | | Avg. | | 9.5 | 1.5 | 0.5 | 0 | 0 | 0 | 0 | | | |
| SUPGP047000 Test Article | 1 | | NOC | | | | | | | | <1 | 100.000 | 100 |
| | 2 | | NOC | | | | | | | | <1 | 100.000 | |
| | 3 | | NOC | | | | | | | | <1 | 100.000 | |
| Negative Control | 1 | | NOC | | | | | | | | <1 | N/A | N/A |

NOC = No Observable Colonies = <1 = 0 for calculations
N/A = Not Applicable
Shaded cells = Not tested
For Control samples, CFU/mL = Avg. CFU/Dilution × Dilution × Plating Factor (10)
% Retention = 100 − ((CFU/mL$_{sample}$/CFU/mL$_{inoculum}$) × 100)
Average % Retention = Sum of % Retention for each sample article ÷ 3

The results of Example 8 show that stretched UPE membrane prepared according to example 2 retains 100% of *B. diminuta* bacteria and is bacterial retentive as determined by passing ASTM F838-05/R (2013).

Example 9: Scanning Electron Microscopy (SEM)

Scanning electron microscopy can be used to observe the surface of a membrane and determine whether changes to the membrane surface have occurred during stretching process.

Figure 1B:
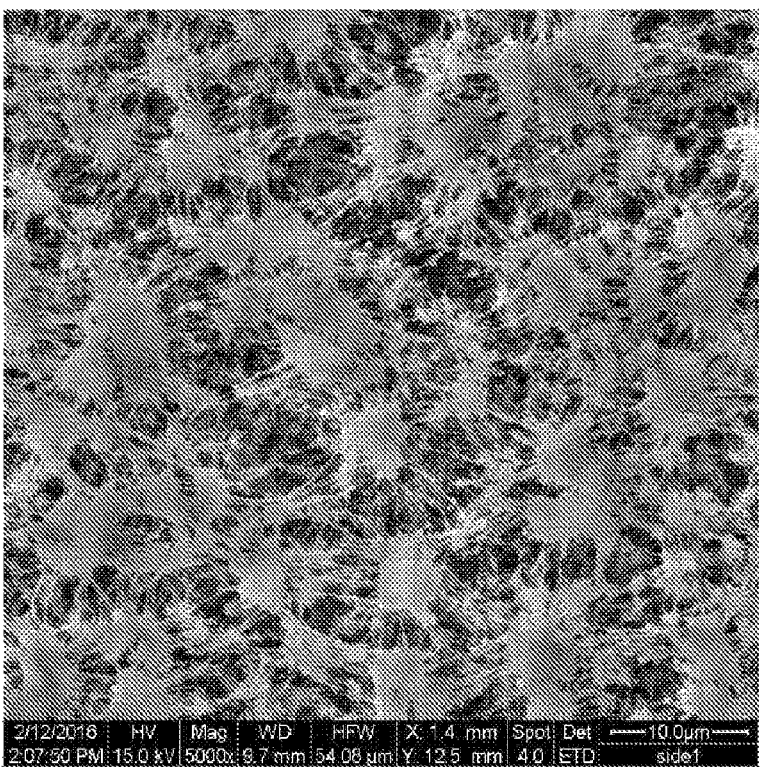

Samples of 0.1 micron rated membrane (visual BP 32 psi in 60% IPA) before and after stretching according to Example 1 were gold sputtered before canning at an accelerating voltage of 10 k using FEI Quanta 200 SEM System (available from FEI Company, Hillsboro, Oreg., USA). FIGS. 1A-B are respective SEM images of an unstretched and stretched symmetric UPE membrane. 5000× magnification used in both cases.

Stretching process results in more opened structure which provided increased air permeability with aligned fibrils extending between nodes which provides particle retention.

Example 10

This example illustrates the impact of the disclosed stretching process on the mechanical properties of the membrane.

The tensile strain at break of the membranes before and after stretching (according to Example 1) was evaluated using Instron™ Model 3342 Compression/Tensile instrument equipped with Instron™ Force Transducer model 2519-102, computer and Blue Hill software.

One sample in the machine direction and in the cross web direction from each membrane was tested by continuously stretching the sample until it breaks. A metal die cutter was used to cut sample with 1"×4.5" dimensions.

Figure 2:
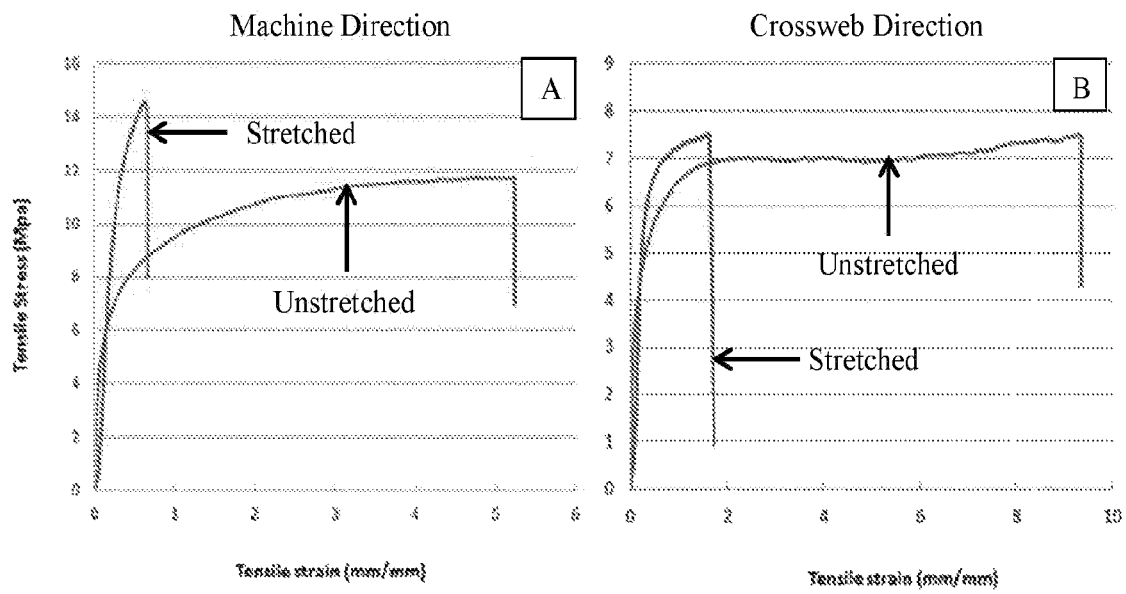
FIGS. 2A-B depict stress-strain curves in the machine (MD)(FIG. 2A) and crossweb (CW)(FIG. 2B) directions for unstretched UHMWPE membrane (blue) and stretched UHMWPE membrane (red). The tensile strain at break of the membrane decreases after stretching by approximately a factor of 8 MD and a factor of 5.5 CW.

FIGS. 2A-B depicts stress-strain curves in the machine (MD) (FIG. 2A) and crossweb (CW) directions (FIG. 2B) for unstretched UHMWPE membrane (blue) and stretched UHMWPE membrane (red). The tensile strain at break of the membrane decreases after stretching by approximately a factor of 8 MD and a factor of 5.5 CW.

FIGS. 2A-B show that the unstretched porous polyethylene membrane has a tensile stress in megapascals of about 10 MPa to about 14 MPa and a tensile strain in millimeters per millimeter of about 4.5 mm/mm to about 5.5 mm/mm as measured in the machine direction and the unstretched membrane has a tensile stress in megapascals of about 6.5 MPa to about 8.5 MPa and a tensile strain in millimeters per millimeter of about 7.0 mm/mm to about 9.5 mm/mm measured in the cross web direction. The graphs further show that the stretched porous polyethylene membrane has a tensile stress in megapascals of about 12 MPa to about 16 MPa and a tensile strain in millimeters per millimeter of about 0.5 mm/mm to about 0.9 mm/mm as measured in the machine direction and the vent membrane has a tensile stress in megapascals of about 6 MPa to about 8.5 MPa and a tensile strain in millimeters per millimeter of about 1.0 mm/mm to about 1.8 mm/mm measured in the cross web direction.

Example 11

This example illustrates the impact of Gamma sterilization on the mechanical properties of the stretched membranes.

The membranes stretched according to Example 1 and modified according to Example 5 were used in this Example. A 15×30 cm membrane sheet was placed in a sealed polyethylene bag and exposed to Gamma radiation dose of 30.6 kGy for 395 minutes.

The tensile strain at break of the membranes before and after exposure to Gamma radiation was evaluated using Instron™ Model 3342 Compression/Tensile instrument equipped with Instron™ Force Transducer model 2519-102, computer and Blue Hill software.

Two samples in the machine direction and two samples in the cross web direction from each membrane were tested by continuously stretching the sample until it breaks. A metal die cutter was used to cut sample with 1"×4.5" dimensions.

Figure 3:
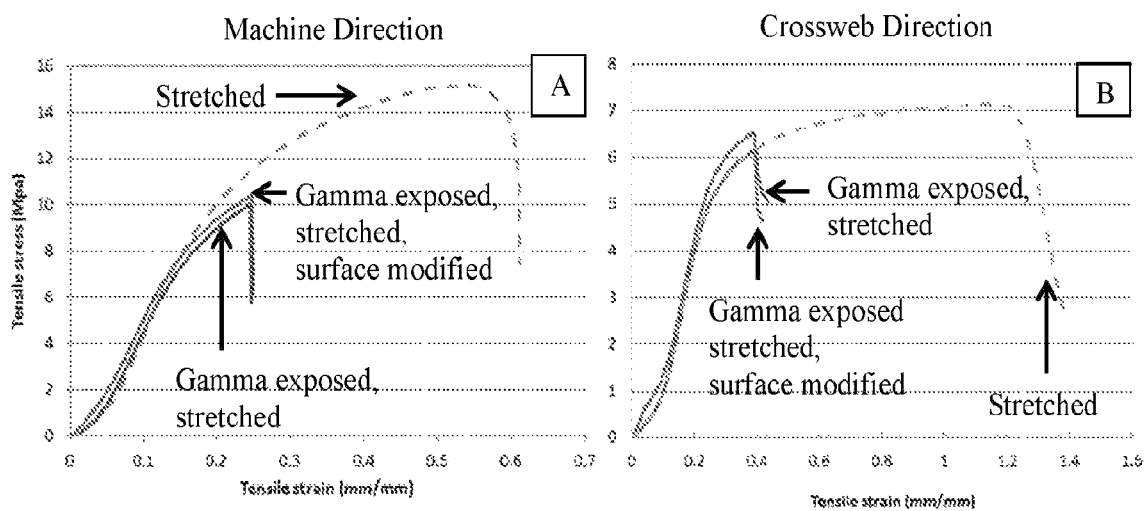
FIGS. 3A-B depict stress-strain curves in the machine (MD)(FIG. 3A) and crossweb (CW)(FIG. 3B) directions for stretched UHMWPE membrane (dotted green line), Gamma exposed stretched UHMWPE membrane (red) and Gamma exposed stretched and surface modified UHMWPE membrane (blue). The tensile strain at break of the stretched and surface-modified-stretched membranes decreased after Gamma exposure by approximately a factor of 2.5 MD and a factor of 3.3 CW relative to stretched membrane before Gamma exposure. The tensile strain at break of the modified and unmodified stretched membranes is the same after Gamma exposure indicating minimal impact of surface modification on mechanical properties of the stretched membrane.

FIGS. 3A-B depicts stress-strain curves in the machine (MD) (FIG. 3A) and crossweb (CW) directions (FIG. 3B) for stretched UHMWPE membrane (dotted green line), Gamma exposed stretched UHMWPE membrane (red) and Gamma exposed stretched and surface modified UHMWPE membrane (blue). The tensile strain at break of the stretched and surface-modified-stretched membranes decreased after Gamma exposure by approximately a factor of 2.5 MD and a factor of 3.3 CW relative to stretched membrane before Gamma exposure. The tensile strain at break of the modified and unmodified stretched membranes is the same after Gamma exposure indicating minimal impact of surface modification on mechanical properties of the stretched membrane.

FIGS. 3A-B show that following gamma radiation treatment of the vent membrane with a dose of gamma rays of at least about 25 kGy, the vent membranes can still have a tensile stress in megapascals of about 8 MPa to about 12 MPa and a tensile strain in millimeters per millimeter of about 0.2 mm/mm to about 0.3 mm/mm as measured in the machine direction, and the vent membrane has a tensile stress in megapascals of about 5 MPa to about 8 MPa and a tensile strain in millimeters per millimeter of about 0.3 mm/mm to about 0.5 mm/mm as measured in the cross web direction.

Example 12

This example illustrates ATR-FTIR spectroscopy of surface modified stretched membrane.

Figure 4:
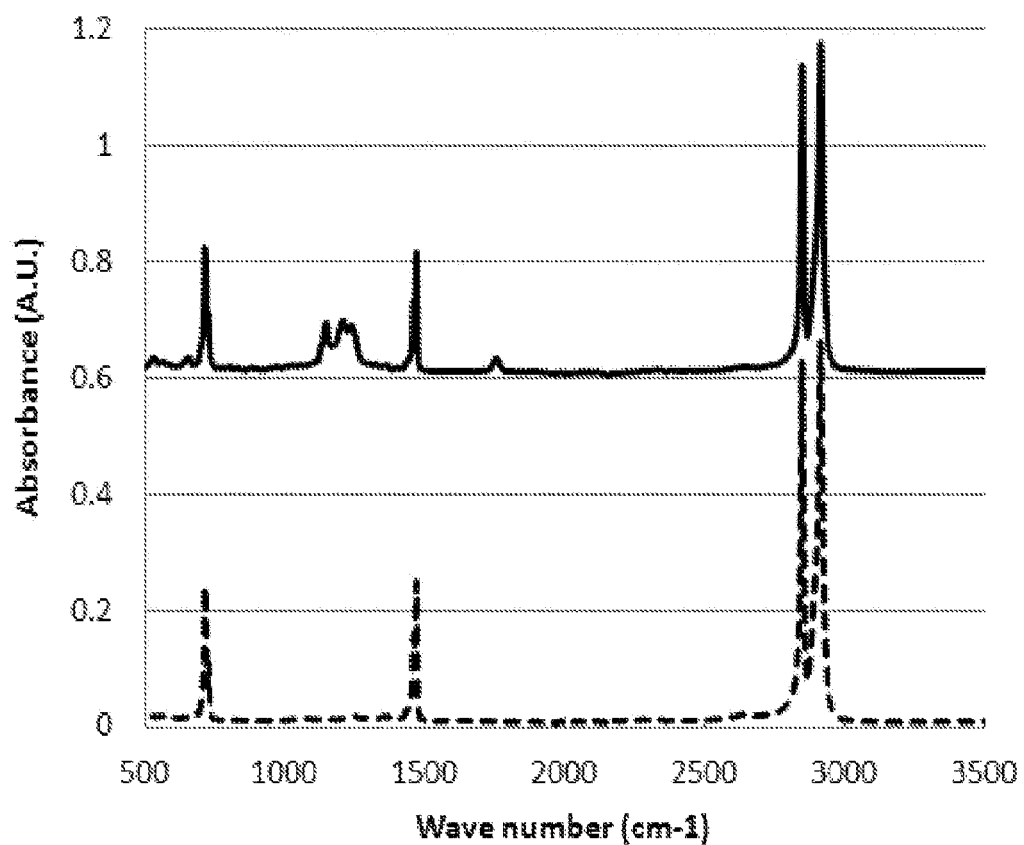
FIG. 4 is an example of IR spectrum using stretched membrane of Example 5 before (dotted line) and after grafting (solid line). The after grafting spectrum was offset higher by 0.6 absorbance units for clarity. After surface modification, the grafted membrane shows characteristic peaks at 1760 cm$^{-1}$ (corresponding to an ester group) and in the 1289-1114 cm$^{-1}$ range (corresponding to carbon-fluorine stretches).

The amount of grafted monomers on the membrane surfaces was determined by ATR-FTIR ("ATR") spectroscopy in the form of a peak ratio. ATR measurements were performed with a Bruker Tensor 27 FTIR fitted with ATR assembly housing a germanium crystal. All spectra were recorded with 32 scans, at 4 cm$^{-1}$ resolution. Background was bare crystal. FIG. 4 is an IR spectrum of the stretched membrane of Example 5 before (dotted line) and after grafting (solid line). The after grafting spectrum was offset by 0.6 absorbance units for clarity. After surface modification, the grafted membrane shows characteristic peaks at 1760 cm$^{-1}$ (corresponding to acrylate peak) and in the 1289-1114 cm$^{-1}$ range (corresponding to carbon-fluorine stretches). The peak area at 1760 cm$^{-1}$ was obtained using OPUS data collection program and divided by the total peak area at 2918 and 2850 cm$^{-1}$ (corresponding to UHMWPE stretches) to obtain the grafted amount of monomer on UHMWPE (ultra high molecular weight polyethylene) surface (0.024).

Example 13

Example 13 describes the preparation of a Benzophenone solution 0.20 grams of benzophenone (99%, Sigma-Aldrich) were dissolved in 40 ml of isopropyl alcohol (IPA) to obtain 0.5 wt % benzophenone solution.

Example 14

Example 14 describes the preparation of a grafting solution containing perfluorinated monomer.

A solution was made containing 4 g of 2-(Perfluorobutyl) ethyl acrylate (97% Fluoryx) and 36 g Galden HT 135 (Solvay).

Example 15

Example 15 demonstrates the surface modification of a stretched UPE membrane.

A 47 mm disk of the stretched UPE membrane was wet for 25 seconds with the 0.5% benzophenone solution described in Example 13. The membrane disk was then dried at room temperature for 5 min. The dry membrane disk was then introduced into the grafting solution described in Example 14. The dish was covered and the membrane was soaked in the grafting solution for 2 minutes. The membrane disk was removed and placed between 1 mil polyethylene sheets. The excess solution was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 nm to 600 nm. Time of exposure is controlled by how fast the assembly moves through the UV unit. In this example, the assembly moved through the UV chamber at 10 feet per minute. After emerging from the UV unit, the membrane was removed from the sandwich and immediately placed in isopropyl alcohol, where it was washed by swirling for 5 minutes. Following this washing procedure the membrane was dried on a holder in an oven operating at 65° C. for 5 min.

Example 16

Example 16 demonstrates the surface energy of the modified, stretched UPE membrane of Example 15.

Surface energy of the surface modified stretched UPE membrane described in Example 15 was determined by adding a small volume of IPA:water solution on the membrane surface and examining which volume percent of IPA in water wets the membrane. The wetting solution causes the membrane surface to become translucent instantly after a small volume of the solution touches the membrane. The surface energy of the wetting solution is considered to be the surface energy of the membrane. The modified membrane in this case wets in 60% IPA.

Example 17

Example 17 demonstrates the liquid intrusion pressure of the modified, stretched UPE membrane of Example 15.

A 47 mm disk of the modified stretched membrane from Example 15 was placed in a filter holder connected to a reservoir holding 100 ml of 80:20 methanol:water mixture. Using a pressure regulator connected to the reservoir, the pressure was increased gradually until the liquid passed from the upstream side to the downstream side of the membrane inside the filter holder. The minimum pressure required to push the liquid through the pores of the dry membrane is defined as the liquid intrusion pressure of the membrane.

The result of this experiment showed that the liquid intrusion pressure of the surface modified stretched membrane was 7 psi.

INCORPORATION BY REFERENCE AND EQUIVALENTS

The teachings of all patents, published applications and references cited herein are incorporated by reference in their entirety.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. For example the vent membranes can be used for degassing to remove gases from liquids. Further, the vent membranes can be used for membrane distillation. Still further, the stretched and surface modified membranes can be used as integral or replaceable vents for single use liquid packaging. Even still further, the stretched and surface modified membranes can be used in articles such as protective garments and enclosures. Therefore the spirit and scope of the appended claims should not be limited to the description and the versions contained within this specification.

What is claimed is:

1. A grafted, porous, polyethylene membrane, comprising:
   a) an air permeability in a range from about 4.9 slpm/cm$^2$ to about 9.4 slpm/cm$^2$ when measured at 10 psi;
   b) a surface energy in a range from about 15 dyne/cm to about 25 dyne/cm;
   c) a liquid intrusion pressure in a range from about 5 psi to about 25 psi when measured in 80:20 methanol:water solution; and
   d) a perfluorinated monomer grafted to one or more surfaces of the membrane.

2. The membrane of claim 1, wherein the perfluorinated monomer comprises perfluoro-n-alkyl acrylate or perfluoro-n-octyl acrylate.

3. The membrane of claim 1, wherein the air permeability is in a range of from about 4.9 slpm/cm$^2$ to about 6.1 slpm/cm$^2$ when measured at 10 psi.

4. The membrane of claim 1, wherein the surface energy is in a range of from about 21 to about 23 dyne/cm.

5. The membrane of claim 1, wherein the liquid intrusion pressure is in a range of from about 20 psi to about 25 psi when measured in 80:20 methanol:water solution.

6. The membrane of claim 1, wherein the membrane is bacterial retentive.

7. The membrane of claim 1, wherein the membrane is uniaxially stretched or biaxially stretched.

8. The membrane of claim 1, wherein the membrane exhibits IR absorption corresponding to an ester group and corresponding to carbon-fluorine stretches.

9. The membrane of claim 1, wherein the membrane has an air permeability in a range of from about 5.9 slpm/cm$^2$ to about 9.4 slpm/cm$^2$ when measured at 10 psi and a bubble point in a range of from about 12 psi to about 19 psi, wherein the polyethylene membrane has a molecular weight in a range of from about 2,000,000 Daltons to about 9,000,000 Daltons.

10. A vent membrane comprising: a gamma radiation stable porous polymer membrane and perfluorinated monomer modifying one or more surfaces of the porous polymer membrane; said vent membrane is bacterial retentive as determined by ASTM F838-05 and has:
    a) an air permeability in a range from about 4.9 slpm/cm$^2$ to about 9.4 slpm/cm$^2$ when measured at 10 psi;
    b) a surface energy in a range from about 15 dyne/cm to about 25 dyne/cm; and optionally,
    c) a tensile strain in millimeters per millimeter of about 0.2 mm/mm to about 0.3 mm/mm as measured in the machine direction and said vent membrane has a tensile stress in megapascals of about 5 MPa to about 8 MPa and a tensile strain in millimeters per millimeter of about 0.3 mm/mm to about 0.5 mm/mm as measured in the cross web direction following gamma radiation treatment of said vent membrane with a dose of gamma rays of at least about 25 kGy.

11. The vent membrane of claim 10, wherein the membrane is a porous polyethylene membrane is uniaxially stretched or biaxially stretched.

12. The vent membrane of claim 10, wherein the membrane is a porous polyethylene membrane is an ultrahigh molecular weight polyethylene.

13. The vent membrane of claim 10, wherein the vent membrane is secured to a housing.

14. A method of making a surface modified, porous, polyethylene membrane, comprising:
    a) contacting a polyethylene membrane with an alcohol solution comprising benzophenone;
    b) contacting the polyethylene membrane with a grafting solution to surface modify the membrane comprising:
       i) a perfluorinated monomer; and
       ii) decamethyltrisiloxane; and
    c) exposing the membrane to electromagnetic radiation, thereby resulting in a surface modified, porous ultrahigh molecular weight polyethylene membrane.

15. The method of claim 14, wherein contacting the polyethylene membrane with an alcohol solution comprises wetting a porous polyethylene membrane with the solution comprising benzophenone.

16. The method of claim 14, wherein contacting the polyethylene membrane with a grafting solution comprises stretching the porous polyethylene membrane, wherein the porous polyethylene membrane has a tensile stress in megapascals of about 12 MPa to about 16 MPa and a tensile strain in millimeters per millimeter of about 0.5 mm/mm to about 0.9 mm/mm as measured in the machine direction; and contacting the stretched polyethylene membrane with the grafting solution.

17. The method of claim 16, wherein the stretched polyethylene membrane has a tensile stress in megapascals of about 6 MPa to about 8.5 MPa and a tensile strain in millimeters per millimeter of about 1.0 mm/mm to about 1.8 mm/mm measured in a cross web direction.

\* \* \* \* \*